(12) United States Patent
Vaccani

(10) Patent No.: US 7,085,664 B2
(45) Date of Patent: Aug. 1, 2006

(54) METHOD AND DEVICE FOR AXIS CONTROL FOR MACHINE TOOLS AND THE LIKE

(76) Inventor: Lucio Vaccani, Via Capodistria, 21, 23900 Lecco (IT)

( * ) Notice: Subject to any disclaimer, the term of this patent is extended or adjusted under 35 U.S.C. 154(b) by 33 days.

(21) Appl. No.: 10/498,479

(22) PCT Filed: Dec. 20, 2002

(86) PCT No.: PCT/EP02/14686
§ 371 (c)(1),
(2), (4) Date: Jun. 14, 2004

(87) PCT Pub. No.: WO03/056402
PCT Pub. Date: Jul. 10, 2003

(65) Prior Publication Data
US 2005/0066734 A1    Mar. 31, 2005

(30) Foreign Application Priority Data
Dec. 24, 2001 (IT) ............................ MI2001A2798

(51) Int. Cl.
*G01C 17/38* (2006.01)
*G01C 9/00* (2006.01)
*G01P 7/00* (2006.01)

(52) U.S. Cl. .................. 702/95; 702/150; 702/152; 702/153; 702/142; 318/567

(58) Field of Classification Search .............. 702/95, 702/150, 152, 153, 142; 318/567, 568.1, 318/568.11
See application file for complete search history.

(56) References Cited

U.S. PATENT DOCUMENTS 4,528,491 A    7/1985  Takeuchi et al.
4,689,756 A    8/1987  Noguchi et al.
4,912,383 A *  3/1990  Takeyama et al. ...... 318/568.11
5,416,716 A    5/1995  Zeman et al.
5,977,739 A   11/1999  Ohsawa

FOREIGN PATENT DOCUMENTS

EP    A-0 417 337    3/1991

OTHER PUBLICATIONS

A. Juliana: "Stepping Motor Control Circuit. Dec. 1976." IBM Technical Disclosure Bulletin, vol. 19, No. 7, Dec. 1, 1976, pp. 2692-2693, XP002237238 New York, US the whole document.

"Simple Method to Handle Asymmetrical Profiles of Stepper Motors" IBM Technical Disclosure Bulletin, IBM Corp. New York, US, vol. 31, No. 9, Feb. 1, 1989, pp. 260-261, XP 000023806 ISSN: 0018-8689 the whole document.

* cited by examiner

*Primary Examiner*—Michael Nghiem
*Assistant Examiner*—Meagan S Walling
(74) *Attorney, Agent, or Firm*—Modiano & Associati; Albert Josif; Daniel O'Byrne

(57) ABSTRACT

A method for controlling the axes of motors, for machine tools and the like, including the steps of: calculating, from a sequence of relative position data of each axis and of actuation states at each definite instant, a path for each individual axis, starting from parameters of initial speed, number of steps and final speed; defining a three-dimensional matrix that contains, for each axis, initial speed, number of steps and final speed, each element of the three-dimensional table, constituted by the intersection in space of the three parameters, containing an address that is suitable to point to the vector which describes a corresponding waveform; driving the axis according to the waveform.

6 Claims, 1 Drawing Sheet

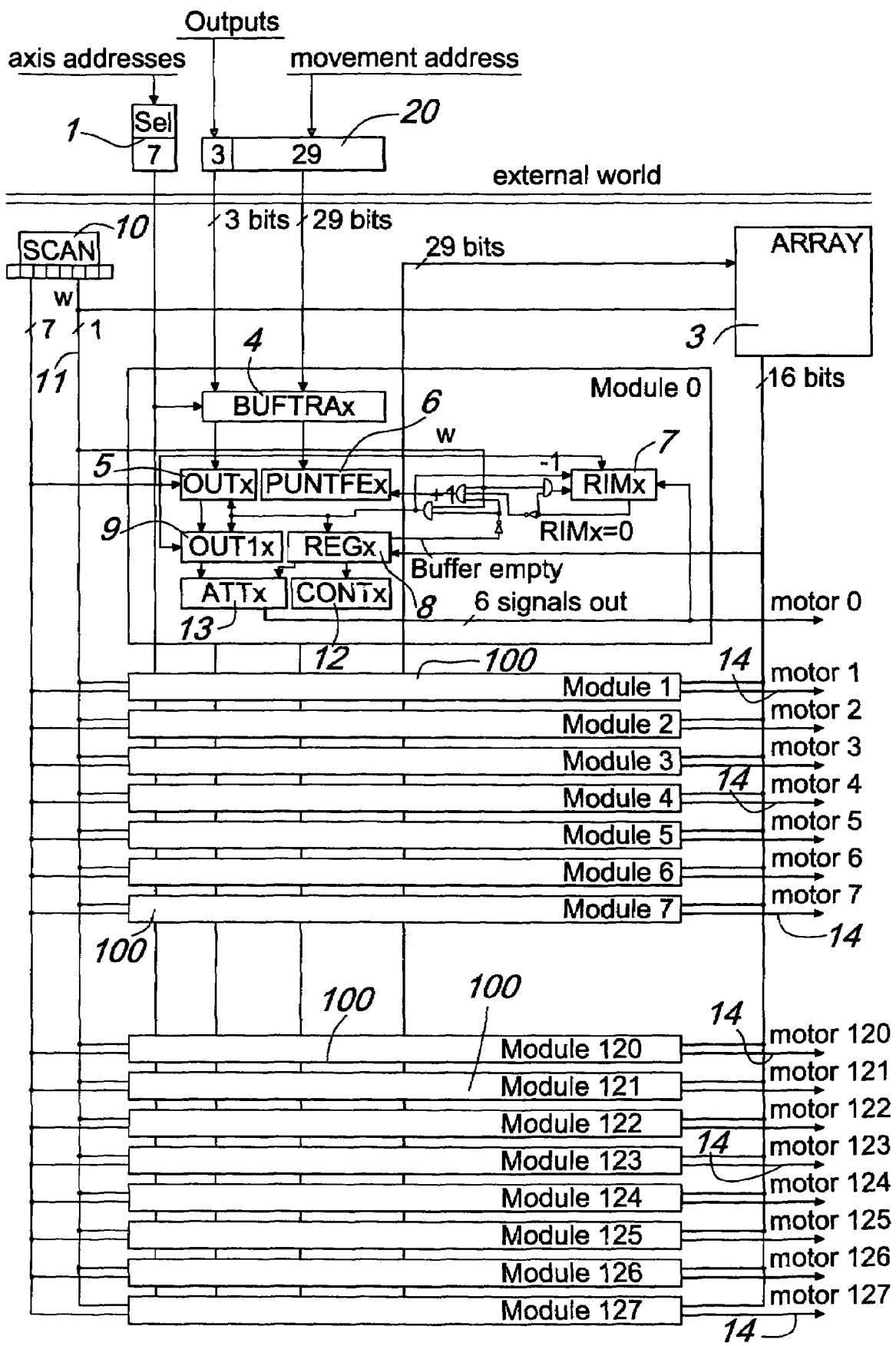

METHOD AND DEVICE FOR AXIS CONTROL FOR MACHINE TOOLS AND THE LIKE

The present invention relates to a method and a device for generating waves, particularly for axis control for machine tools and the like.

BACKGROUND OF THE INVENTION

As is known, generally two types of axis control systems are currently commercially available: closed-loop and open-loop.

The first type of control system is generally applied to brushless motors or torque motors or DC motors, which perform a movement by determining in each instant the current position and comparing it with the expected position and changing the torque so as to reach the next point with the least possible error.

The solution described above is characterized by low path repeatability, which becomes even more critical when the number of axes involved and mutually interpolated becomes significant (for example 8 or 10).

In order to improve path repeatability, the only possible solution is to increase the density of the points that constitute such paths: in this case, however, the torques involved and the vibration would increase considerably.

Accordingly, the controller, which must examine a huge number of parameters, risks not being able to control the error of all the axes involved, leading therefore to instability or failure of the system.

The second control system, of the open-loop type, normally uses step motors. The open-loop system does not provide for error minimization, but starts from the assumption that if one aims to reach a particular position at a certain instant, that position is assuredly reached at that precise instant. Clearly, this system is particularly vulnerable to a sudden and unexpected variation of the contrast torque, but apart from this drawback, it allows high repeatability if the path is properly managed.

Currently commercially available closed-loop controllers, in order to be suitable for general use, are characterized by a huge series of parameters that relate to all the dynamic variables involved (speeds, accelerations, masses et cetera) and by the path correction criteria, which are in practice a parameterized dynamic composition of PID (Proportional, Integral, Derivative) control.

Therefore, this solution is feasible only when the intervention times, and therefore the correction times, are long enough to allow the controller to perform all the necessary calculations.

Open-loop controllers, instead, execute exclusively a preset path that always assumes correct positioning. Substantially, there is no correction as a function of error.

Even in open-loop systems, currently there is an ongoing proliferation of parameters aimed at improving the paths constantly, with the result of greatly encumbering the control.

SUMMARY OF THE INVENTION

The aim of the present invention is therefore to provide a method and a device for generating waves, particularly for axis control, that allows to obtain a harmonic motion in space with the combination of a large number of elementary axes.

Within this aim, an object of the present invention is to provide a method and a system for axis control that allow, given a unique path ensured by a very large stream of points, to obtain a harmonic motion with a rate on the order of milliseconds and to find a system that executes said path.

Another object of the present invention is to provide a method and a device for axis control that are highly reliable, relatively simple to provide, and at competitive costs.

This aim and these and other objects that will become better apparent hereinafter are achieved by a method for generating waves, particularly for controlling the axes of motors, for machine tools and the like, characterized in that it comprises the steps of:

calculating, from a sequence of relative position data of each axis and of actuation states at each definite instant, a path for each individual axis, starting from parameters of initial speed, number of steps and final speed;

defining a three-dimensional matrix that contains, for each axis, initial speed, number of steps and final speed, each element of said three-dimensional table, constituted by the intersection in space of said three parameters, containing an address that is suitable to point to said vector suitable to describe a corresponding waveform;

driving said axis according to said waveform.

BRIEF DESCRIPTION OF THE DRAWINGS

Further characteristics and advantages will become better apparent from the description of preferred but not exclusive embodiments of the method and the device according to the present invention, illustrated only by way of non-limitative example in the accompanying drawings, wherein the only FIGURE is a block diagram of a preferred embodiment of the axis control device according to the present invention.

DESCRIPTION OF THE PREFERRED EMBODIMENTS

With reference to the FIGURE, the axis control method according to the present invention provides for the following steps.

Assume that a point stream generator, for example a vision system, is available and provides in output a set of points generated at the times $t_i$.

These points therefore constitute a vector $P_i$ ($X1i$, $X2i$, ..., Xni, Ti). The control device that uses the control method according to the invention must receive said stream of points, construct a path with n dimensions, modulating the i-th segment with the preceding one and the following one, so as to have assurances as to the executability of the movement and therefore be able to execute it.

Substantially, the relative positions that all the axes of a machine tool must assume at preset times (for example every 20 msec) starting from an already-reached initial position, originate from the point stream generator. An actuation value that is specific for the process to be performed is associated with each relative position that each axis must assume at a preset time.

In order to achieve harmonic motion, the relative movement data must be correlated to the previous movement data item and with the next movement data item, so that each movement, independently of its sign, is characterized by three data, one of which is already known, i.e., the movement itself, whilst the other two are the initial speed and the final speed.

Therefore, each relative position of an axis is characterized by three values, i.e., initial speed, movement, and final speed. Therefore it is possible to create a three-dimensional table characterized by these three parameters.

The element pointed in the three-dimensional table contains an address, which in turn points to a vector that contains in detail the description of the waveform to be sent to the motor driver, including the operating mode. The pointed vector is part of a table of vectors that can be pointed by means of the address found in the three-dimensional table by the intersection of the three parameters described above. Substantially, there is a vector for each address and each address is determined, in the three-dimensional table, by the intersection of three particular parameters of initial speed, final speed and movement.

Therefore, the complete vector table that contains all the paths that can be traced by the three parameters of initial speed, final speed and number of steps or movement is extremely large, and therefore its creation requires a program that calculates all the elementary paths.

Once the table has been calculated, it is possible to run a program for checking it and optionally correcting it, such program examining critically all the paths and optionally correcting them.

The final table is merely theoretical, since it does not take into account the masses involved, the power levels of the motors, frictions and geometries; therefore, during the initialization of the machine tool to which the control device is to be applied it is necessary to test one by one all the paths and validate them by using the circuits for controlling loss of step or any discrepancies that can exceed the bounds of the time window of acceptability during the movement of the axis of the machine tool.

Therefore, the method according to the invention provides for a first step for the acquisition of relative position data and of actuation states for every time Ti.

At this point, a suitable program calculates the path for each individual axis and transfers to the control device a bit word that specifies for each axis:

the address of the axis, the direction of the movement, the state of actuation and the address of the vector in the validated table.

At this point, execution is transferred to the control device.

The preparation of the theoretical table described above therefore comprises a step for generating the table that describes the vectors of the signal starting from the parameters of initial speed, number of steps (or movement) and final speed.

Then the real movement is checked, and the theoretical table is reduced to a validated table. The validated table takes into account the masses involved, the frictions and all the situations that occur in reality and were not taken into account in the theoretical step of table preparation.

Therefore, this validation step leads to the generation of a new table, which allows to determine the addresses of the validated table from the three initial data of initial speed, movement and final speed.

Substantially, the theoretical table is the table that describes all the paths that can be traced by the three parameters of initial speed, number of steps and final speed, and is therefore very large.

The theoretical table is the vector table described above, which is pointed by the three-dimensional table that contains the three parameters of initial speed, movement and final speed.

The accompanying figure is a block diagram of the device used in the method according to the present invention. In this figure it is assumed as an example that the axes to be driven are 128, with 128 corresponding motors 14. Therefore, the number of bits used must be understood as being solely correlated to the number of motors used. In this case, in fact, with 128 motors, selection of the address of the axis to be moved can be performed with a seven-bit jump, which allows to specify a number up to 128.

If the number of motors is different, the number of bits used may of course change.

The accompanying figure is divided into two portions: portion A represents the outside world, i.e., the personal computer that is used to drive portion B, which instead represents the board on which the device according to the invention is implemented, allowing to perform the corresponding method.

Therefore, the personal computer that is used sends a data item, in this case a seven-bit data item, designated by the reference numeral 1, which represents the address of the axis to be moved, and a word, in this case a 32-bit word, designated by the reference numeral 2, in which the first three bits contain the direction of the movement and two output signals (actuator commands, et cetera) and the subsequent 29 bits contain the address, obtained from the three-dimensional table defined earlier (initial speed, final speed and number of steps), of a vector contained in an EPROM memory, designated by the reference numeral 3, which is part of the device that is suitable to implement the method according to the invention. The vector represents the elementary movement that must be performed by the axis selected by means of the address 1 of the axis.

The word 2 is input to a temporary memory 4, which is addressed by the seven-bit data item 1 for axis selection. In the specific case, therefore, 128 temporary memories 4, one for each motor, are available and must be filled by the data that are output by the personal computer.

A latch element 5 and a counter 6 are associated with each temporary memory 4 (it should be noted that for the sake of simplicity of description, FIG. 2 illustrates a single block that indicates the plurality of temporary memories, but it should be understood that said block is divided in this case into 128 separate blocks). In the case being considered, the latch element is of the 3-bit type and the counter is a 29-bit counter. The data item contained in the temporary memory 4 follows immediately in the latch element 5 and in the counter every time an additional counter 7, suitable to count the remaining words that constitute the vector of the movement of the axis X, is equal to zero.

The part described above of the board of the device is asynchronous and is driven by the personal computer.

The part that is instead described hereinafter is synchronous and completely uncorrelated to the first portion as regards timing.

A second counter 10, in the case a ten-bit counter in which the seven higher bits define sequentially 128 configurations by selecting one by one modules 100 of all the axes that are present in the board, and the three lower bits have a preset configuration, sends a write location signal, designated by the reference numeral 11.

The second counter, when counted, selects the first counter 6, which addresses the first element of the vector inside the memory 3, the counter 7, a register 8 and the two latch elements 5 and 6.

When the signal 11 arrives, if the counter 7 is equal to zero, the data item pointed in the memory 3 enters the counter 7 and the counter 6 is incremented by one. If instead the counter 7 is nonzero and the register 8 is empty, the data item contained in the memory 3 is written to the register 8, the data item contained in the latch element 5 is written to the second latch element 6, the first counter 6 is incremented by one, and the counter 7 is decremented by one.

Finally, if the counter 7 is equal to zero and the register 8 is not empty, nothing happens, and the system waits for the next selection related to the axis, which is performed by selection of the address 1.

At this point, the data must be transferred to the actuators, and said transfer occurs asynchronously.

When a fourth counter 12 is zero, the latch element 6 and the register 8 compose the data item and transfer it to an actuator 13 related to the motor to be driven, in addition to transferring the data item into the fourth counter 12.

Each one of the elements 4–9 and 12–13 is present for each one of the motors to be driven.

The vector table, in addition to indicating the paths, indicates for each path the mode of actuation of the driver of the motor, which determines the operation of the motor in half-step, full-step or microstep mode.

In practice it has been found that the method and the device for axis control according to the invention allow to achieve the described aim and objects, since they allow to obtain a harmonic motion in space with the combination of a large number of elementary axes. Harmonic motion is obtained by means of calculations that are extremely simplified with respect to the systems of the known art.

The method and the device thus conceived are susceptible of numerous modifications and variations, all of which are within the scope of the appended claims; all the details may further be replaced with other technically equivalent elements.

The disclosures in Italian Patent Application No. MI2001A002798 from which this application claims priority are incorporated herein by reference.

What is claimed is:

1. A method for generating waves, particularly for controlling the axes of motors, for machine tools and the like, the method being implemented in a control device with a computer program and comprising the steps of:

calculating, from a sequence of relative position data of each axis and of actuation states at each definite instant, a pat vector for each individual axis, starting from parameters of initial speed, number of steps and final speed, defining a path vector table containing a path vector for each of said axis;

defining a three-dimensional table that contains, for each axis, initial speed, number of steps and final speed, each element of said three-dimensional table, constituted by the intersection in space of said three parameters, containing an address that is adapted to point to said pat vector which describes a corresponding waveform;

driving said axis according to said waveform.

2. The method according to claim 1, wherein said step of calculating the path vector for each individual axis comprises transferring, for each axis, a bit word that specifies:

the address of said axis, the direction of motion, the state of at least one actuation output, and the address of said path vector in a path vector table.

3. The method according to claim 1, wherein said path vector table is generated starting from the parameters of initial speed, number of steps and final speed.

4. The method according to claim 3, wherein said step of generating said path vector table comprises the additional steps of:

checking the real paths of said axes and reducing said vector table to a validated vector table.

5. The method according to claim 1, wherein said waveform is to be sent to a driver of the corresponding motor for the actuation of said motor.

6. The method according to claim 1, wherein the element of said three-dimensional table defined by the set of said three parameters contains an address that points to a vector of said path vector table.

* * * * *